United States Patent
Xiu et al.

(10) Patent No.: US 10,719,599 B2
(45) Date of Patent: Jul. 21, 2020

(54) VERIFICATION CODE GENERATION TO IMPROVE RECOGNITION ACCURACY BY A PERSON AND RECOGNITION DIFFICULTY BY A COMPUTER PROGRAM

(71) Applicant: Alibaba Group Holding Limited, George Town (KY)

(72) Inventors: Chao Xiu, Hangzhou (CN); Lei Wang, Hangzhou (CN); Xing Chen, Hangzhou (CN); Chuanzhi Li, Hangzhou (CN); Yongzhi Zhang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/393,839

(22) Filed: Apr. 24, 2019

(65) Prior Publication Data

US 2019/0251243 A1    Aug. 15, 2019

Related U.S. Application Data

(63) Continuation of application No. PCT/CN2017/113595, filed on Nov. 29, 2017.

(30) Foreign Application Priority Data

Dec. 8, 2016    (CN) .......................... 2016 1 1125263

(51) Int. Cl.
*G06F 21/36*    (2013.01)
*H04L 29/06*    (2006.01)
(Continued)

(52) U.S. Cl.
CPC .............. *G06F 21/36* (2013.01); *G06F 21/31* (2013.01); *H04L 9/0863* (2013.01);
(Continued)

(58) Field of Classification Search
CPC ..... G06F 2221/2103; G06F 2221/2133; G06F 21/316; G06F 21/36; H04M 2203/2027; H04W 12/06; G06K 9/6255
See application file for complete search history.

(56) References Cited

U.S. PATENT DOCUMENTS 7,890,426 B2    2/2011 Maloney
9,202,076 B1 *  12/2015 Chazin ................ G06F 21/6218
(Continued)

FOREIGN PATENT DOCUMENTS

CN    102075507    5/2011
CN    101895542    3/2013
(Continued)

OTHER PUBLICATIONS

Hannagan, Thomas, et al. "Deciphering CAPTCHAs: What a Turing test reveals about human cognition." PloS one 7.3 (2012): e32121. (Year: 2012).*

(Continued)

*Primary Examiner* — Michael Simitoski
(74) *Attorney, Agent, or Firm* — Fish & Richardson P.C.

(57) ABSTRACT

A verification request is received. In response to receiving the verification request, a first character string is obtained. The first character string comprises one or more variable characters. At least one of the one or more variable characters in the first character string is replaced with at least one backup character to generate a second character string based on multiple pre-established corresponding relationships. A verification code is generated based on the second character string. A user corresponding to the verification request is verified based on a user input corresponding to the verification code.

17 Claims, 8 Drawing Sheets

(51) Int. Cl.
*H04L 9/08* (2006.01)
*H04L 9/32* (2006.01)
*G06F 21/31* (2013.01)
*H04W 12/06* (2009.01)

(52) U.S. Cl.
CPC .... *H04L 9/3228* (2013.01); *G06F 2221/2133* (2013.01); *H04W 12/06* (2013.01)

(56) References Cited

U.S. PATENT DOCUMENTS

| | | | | |
|---|---|---|---|---|
| 2007/0250920 | A1* | 10/2007 | Lindsay | G06F 21/31 726/7 |
| 2011/0055585 | A1* | 3/2011 | Lee | H04L 9/0844 713/183 |
| 2012/0189194 | A1* | 7/2012 | Srivastava | G06F 21/316 382/161 |
| 2012/0210393 | A1* | 8/2012 | Yamahara | G06F 21/31 726/2 |
| 2014/0196133 | A1* | 7/2014 | Shuster | H04L 63/126 726/7 |
| 2015/0180856 | A1* | 6/2015 | Shuster | H04L 63/126 726/7 |
| 2016/0112393 | A1 | 4/2016 | Shuster | |
| 2017/0300676 | A1* | 10/2017 | Hou | G06F 21/31 |

FOREIGN PATENT DOCUMENTS

| | | |
|---|---|---|
| CN | 104283682 | 1/2015 |
| CN | 104794385 | 7/2015 |
| CN | 104796252 | 7/2015 |
| CN | 104883351 | 9/2015 |
| CN | 106156597 | 11/2016 |
| CN | 106899411 | 6/2017 |
| KR | 101647027 | 8/2016 |
| TW | 201621734 | 6/2016 |

OTHER PUBLICATIONS

International Search Report and Written Opinion in International Application No. PCT/CN2017/113595, dated Jan. 5, 2018, 9 pages (with partial translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT Written Opinion of the International Searching Authority in International Application No. PCT/CN2017/113595, dated Jan. 5, 2018, 14 pages (with English translation).
PCT International Preliminary Report on Patentability in International Application No. PCT/CN2017/113595, dated Jun. 11, 2019, 5 pages.
Bergmair et al., "Towards Human Interactive Proofs in the Text-Domain Using the Problem of Sense-Ambiguity for Security," Information Security 7th International Conference, Sep. 2004, 3225:257-267.
Extended European Search Report in European Application No. 17879427.7, dated Oct. 9, 2019, 10 pages.
Goto et al., "Text-Based CAPTCHA Using Phonemic Restoration Effect and Similar Sounds," 2014 IEEE 38th International Computer Software and Applications Conference Worshops, Jul. 2014, pp. 270-275.
Goto et al., "Text-Based CAPTCHA Using Phonemic Restoration Effect and Similar Sounds," 2014 IEEE 38th International Computer Software and Applications Conference Workshops, Jul. 2014, pp. 270-275.

* cited by examiner

VERIFICATION CODE GENERATION TO IMPROVE RECOGNITION ACCURACY BY A PERSON AND RECOGNITION DIFFICULTY BY A COMPUTER PROGRAM

CROSS-REFERENCE TO RELATED APPLICATIONS

This application is a continuation of PCT Application No. PCT/CN2017/113595, filed on Nov. 29, 2017, which claims priority to Chinese Patent Application No. 201611125263.0, filed on Dec. 8, 2016, and each application is hereby incorporated by reference in its entirety.

TECHNICAL FIELD

The present application relates to the field of computer technologies, and in particular, to a method and apparatus for verification based on a verification code.

BACKGROUND

Currently, a verification code, also referred to as Completely Automated Public Turing test to tell Computers and Humans Apart (CAPTCHA), is widely used as a secure verification method. The verification code can be used to determine whether an operator is a user or an unauthorized program. The verification code can prevent unauthorized operations such as a malicious attempt to log in to a user account, cracking of a user password through enumeration, or sales volume manipulation or speaking through script control.

In the existing technology, to prevent the unauthorized program from automatically recognizing the verification code, a method for displaying the verification code is increasingly complex. The verification code is usually displayed by using the following methods: In a first method, as shown in FIG. 1a, the verification code is expressed by using a number or a text, and a background is added into a verification code display area, or the number or the text is distorted, to improve interference of the verification code. In a second method, as shown in FIG. 1b, a plurality of pictures and prompt information are provided, so that the user recognizes a corresponding quantity of specific pictures from the plurality of similar pictures based on the prompt information.

However, in the previous methods, the verification code is displayed by using a relatively complex method. Although an unauthorized script's automatic recognition can be interfered with, additional interference is also caused to the user. In other words, after the previous verification code is displayed to the user, a possibility that the user incorrectly recognizes the verification code increases. If an error occurs, the user needs to refresh the verification code and continue to recognize the newly generated verification code, until the verification succeeds. Apparently, the previous verification process in the existing technology possibly takes a long time. In particular, when a recognition error occurs, the user needs to repeatedly perform verification.

SUMMARY

Implementations of the present application provide a method for verification based on a verification code, to alleviate a problem in the existing technology that a relatively long time is consumed in a verification process as a user is likely to incorrectly recognize a verification code.

The implementations of the present application provide an apparatus for verification based on a verification code, to alleviate a problem in the existing technology that a relatively long time is consumed in a verification process as a user is likely to incorrectly recognize a verification code.

The following technical solutions are used in the implementations of the present application.

An implementation of the present application provides a method for verification based on a verification code, including: receiving a verification request; obtaining a pre-generated first character string after receiving the verification request, where the first character string includes at least one variable character; replacing some or all variable characters with backup characters based on a pre-established correspondence between a variable character and a backup character, to obtain a second character string; and generating a verification code based on the second character string, and verifying a user corresponding to the verification request.

An implementation of the present application provides an apparatus for verification based on a verification code, including: a receiving module, configured to receive a verification request; an acquisition module, configured to obtain a pre-generated first character string after the verification request is received, where the first character string includes at least one variable character; a replacement module, configured to replace some or all variable characters with backup characters based on a pre-established correspondence between a variable character and a backup character, to obtain a second character string; and a verification module, configured to generate a verification code based on the second character string, and verify a user corresponding to the verification request.

At least one of the technical solutions used in the implementations of the present application can achieve the following beneficial effects:

When a server of a service provider verifies the user, the server performs a character replacement operation on a verification code. For the user, a verification code generated through character replacement does not affect the user in terms of learning a meaning of the verification code. In addition, characters in the verification code in the implementations of the present application do not undergo character distortion, color change, or background addition. As such, the user can conveniently and accurately recognize the verification code. For a computer program, the verification code obtained after character replacement possibly includes a plurality of types of characters, and does not comply with a common syntax. As such, it is difficult for the computer program to effectively recognize content represented by the verification code based on a recognition algorithm, thereby effectively reducing a possibility that the computer program performs an unauthorized operation.

Compared with a verification method in the existing technology, the verification method provided in the implementations of the present application increases discernibility of the verification code, so that the user can intuitively learn the meaning of the verification code. Therefore, accuracy of recognizing the verification code by the user can be increased, and a time consumed in a verification process can be reduced. In addition, difficulty of recognizing the verification code by the computer program can be increased, and a possibility that the computer program performs an unauthorized operation can be effectively reduced.

BRIEF DESCRIPTION OF DRAWINGS

The accompanying drawings described here are intended to provide a further understanding of the present application, and constitute a part of the present application. The illustrative implementations of the present application and descriptions of the implementations are intended to describe the present application, and impose no limitation on the present application. In the accompanying drawings.

DESCRIPTION OF IMPLEMENTATIONS

To make the objectives, technical solutions, and advantages of the present application clearer, the following comprehensively describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

Figure 1A:
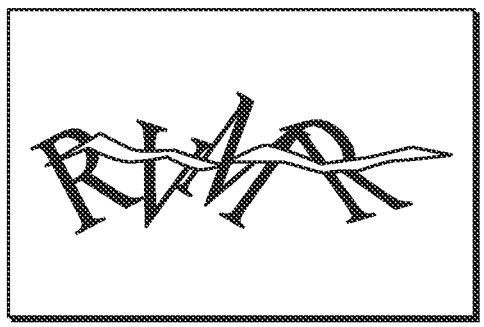
FIG. 1a and FIG. 1b are schematic diagrams illustrating verification codes in the existing technology.
Figure 1B:
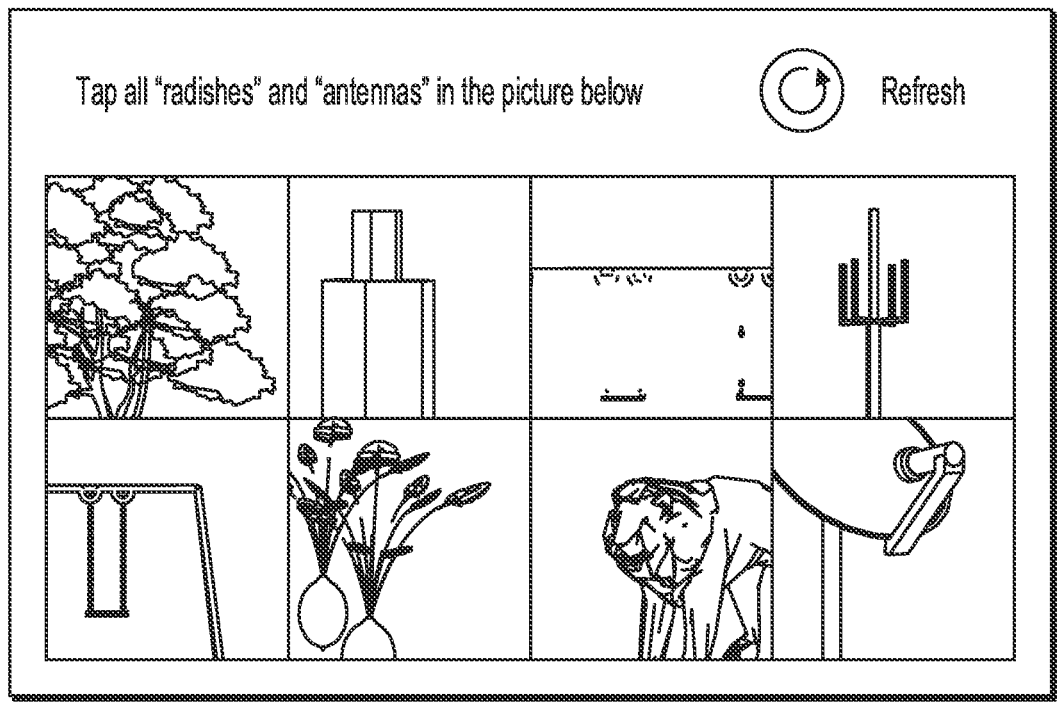
Figure 2A:
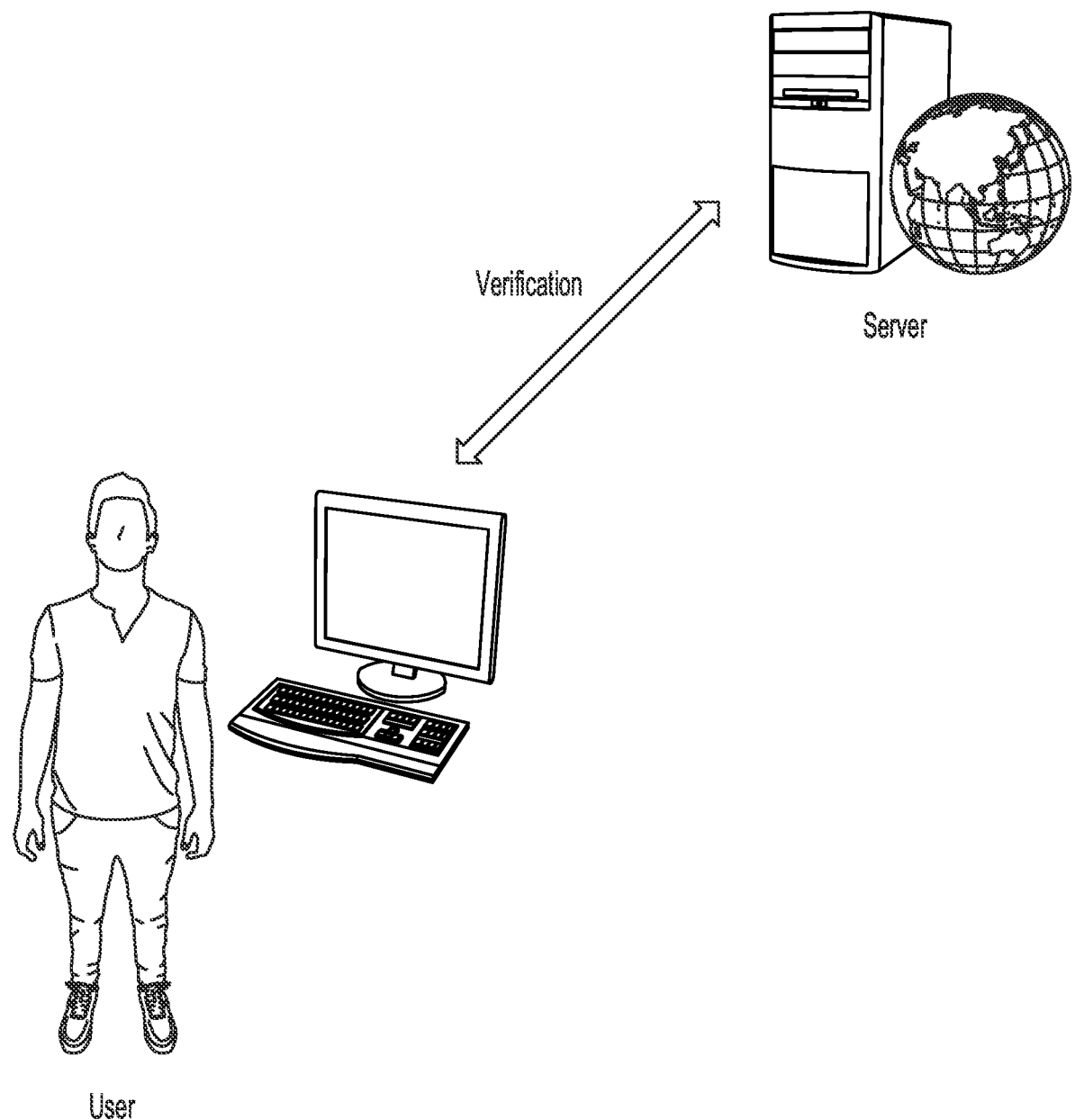
FIG. 2a is a schematic diagram illustrating an architecture on which a process for verification based on a verification code is based, according to an implementation of the present application.

It is worthwhile to note that, in the implementations of the present application, a verification process can be based on an architecture shown in FIG. 2a, and the verification process can be implemented by a server on the back end of an online service provider. The online service provider includes but is not limited to a service provider that can provide an online service, such as a website, a telecommunications operator, or a data center. The server used to implement the verification process can be a server responsible for security maintenance, for example, a security center server on the back end of the online service provider. No limitation is imposed on the present application here. In the subsequent descriptions, the server on the back end of the online service provider is collectively referred to as a server.

A user can be understood as an operator who uses a service provided by the online service provider. It is worthwhile to note here that, in a verification scenario in the implementations of the present application, an authorized operator is an actual person, and an unauthorized operator is a computer script, a program, etc.

The technical solutions provided in the implementations of the present application are described in detail below with reference to the accompanying drawings.

Figure 2B:
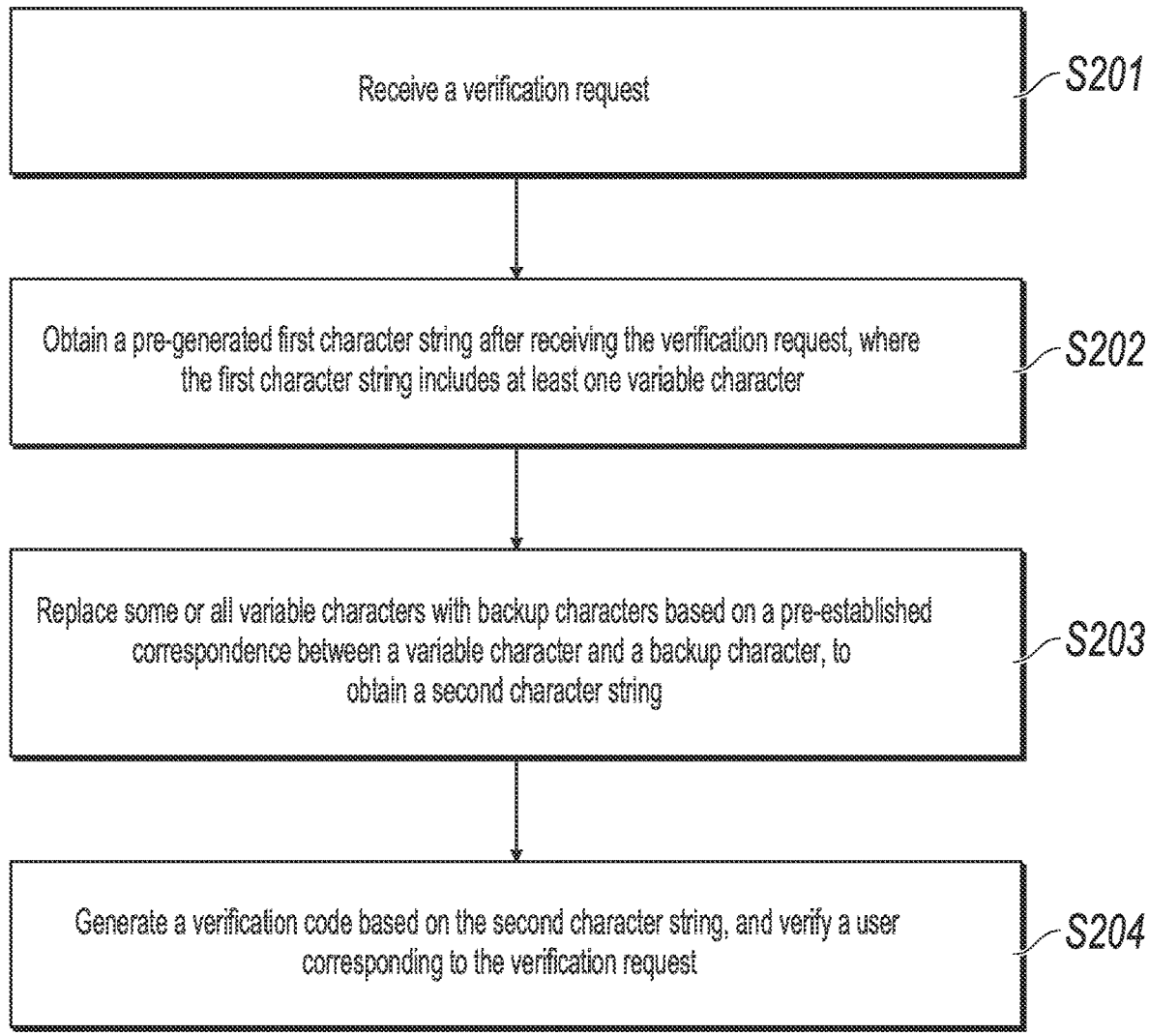
FIG. 2b is a schematic diagram illustrating a process for verification based on a verification code, according to an implementation of the present application.

FIG. 2b shows a process for verification based on a verification code in an implementation of the present application. The process includes the steps below.

S201. Receive a verification request.

In this implementation of the present application, the verification request is usually generated after verification is triggered. In actual operations, the verification request can be triggered by a user, or can be triggered by a server based on demands in actual applications.

In a possible scenario, the user can actively send a verification request. In this case, the verification request is used to trigger a process for verification based on a verification code. In an implementation of this scenario, the process for verification based on a verification code can be used for account login. In other words, after the user enters a login interface (such as an account login interface of a website), it can be considered that the user sends a verification request, and the server correspondingly receives the verification request sent by the user.

In another possible scenario, the server can verify an identity of the user based on a corresponding security rule. For example, the server actively generates a verification code at a pre-determined cycle. Alternatively, when determining that some operations of the user are risky, the server actively generates a verification code and initiates verification to the user, to determine that the operations are not performed by a computer program. Certainly, no limitation is imposed on the present application here.

S202. Obtain a pre-generated first character string after receiving the verification request.

The first character string includes at least one variable character.

The first character string can be understood as a marking character string that includes a number, a text, etc., and has an indication function.

In actual application scenarios, the marking character string is easily recognized by the computer program, thereby increasing a risk of the verification process. Therefore, in this implementation of the present application, the first character string includes a variable character, and the variable character can be replaced with another character, so as to have an interference effect.

S203. Replace some or all variable characters with backup characters based on a pre-established correspondence between a variable character and a backup character, to obtain a second character string.

The backup character can be the same type of character as the variable character. For example, both the backup character and the variable character are Chinese characters, English characters, or numeric characters. Alternatively, the backup character and the variable character can be different types of characters. In an implementation of the present application, a Chinese character can be changed to pinyin. For example, "红" is changed to "hong". In another implementation, a certain word (or phrase) can be changed to a homophonous word (or phrase). For example, "蓝色" can be changed to "兰色".

It is worthwhile to note that, a meaning of the second character string obtained after character replacement does not change, that is, the user can still learn the meaning of the verification code and perform a corresponding operation based on the verification code.

S204. Generate a verification code based on the second character string, and verify a user corresponding to the verification request.

In actual operations, the verification code can be displayed in a format of picture or text information, and is used to instruct the user to perform a certain operation. No limitation is imposed on the present application here.

The second character string is a character string obtained after character replacement. Therefore, the verification code generated based on the second character string can have an interference effect. Compared with an interference method in the existing technology such as character distortion, color change, or background addition, the meaning of the verification code obtained after character replacement in this implementation of the present application does not change. In addition, because the verification code is not displayed by using a complex method, the user can learn the meaning of the verification code and can easily recognize the verification code. Further, because character replacement is performed, it is difficult for a machine to recognize the verification code.

In the previous descriptions, after the verification code is generated, verification can be performed on a corresponding operator (that is, the user) to determine whether the operator is the user or the computer program.

Certainly, in a feasible implementation of the present application, the verification code can be displayed to the user in a corresponding verification interface (such as a login interface), and after the user performs a corresponding operation based on the verification code, verification is performed on the operation based on marking verification information.

Based on the previous steps, when a server of a service provider verifies the user, the server performs a character replacement operation on a verification code. For the user, a verification code generated through character replacement does not affect the user in terms of learning a meaning of the verification code. In addition, characters in the verification code in this implementation of the present application do not undergo character distortion, color change, or background addition. As such, the user can conveniently and accurately recognize the verification code. For the computer program, the verification code obtained after character replacement possibly includes a plurality of types of characters, and does not comply with a common syntax. As such, it is difficult for the computer program to effectively recognize content represented by the verification code based on a recognition algorithm, thereby effectively reducing a possibility that the computer program performs an unauthorized operation.

Compared with a verification method in the existing technology, the verification method provided in this implementation of the present application increases discernibility of the verification code, so that the user can intuitively learn the meaning of the verification code. Therefore, accuracy of recognizing the verification code by the user can be increased, and a time consumed in a verification process can be reduced. In addition, difficulty of recognizing the verification code by the computer program can be increased, and a possibility that the computer program performs an unauthorized operation can be effectively reduced.

It is worthwhile to note that, in this implementation of the present application, because the meaning of the verification code does not change after character replacement is performed on the verification code, characters in the verification code are actually replaced with homophonous or synonymous characters. That is, the pre-establishing a correspondence between a variable character and a backup character includes: determining at least one homophonous character and/or synonymous character of any variable character; using the determined homophonous character and/or synonymous character as a backup character of the variable character, and establishing a correspondence between the backup character and the variable character.

Figure 3:
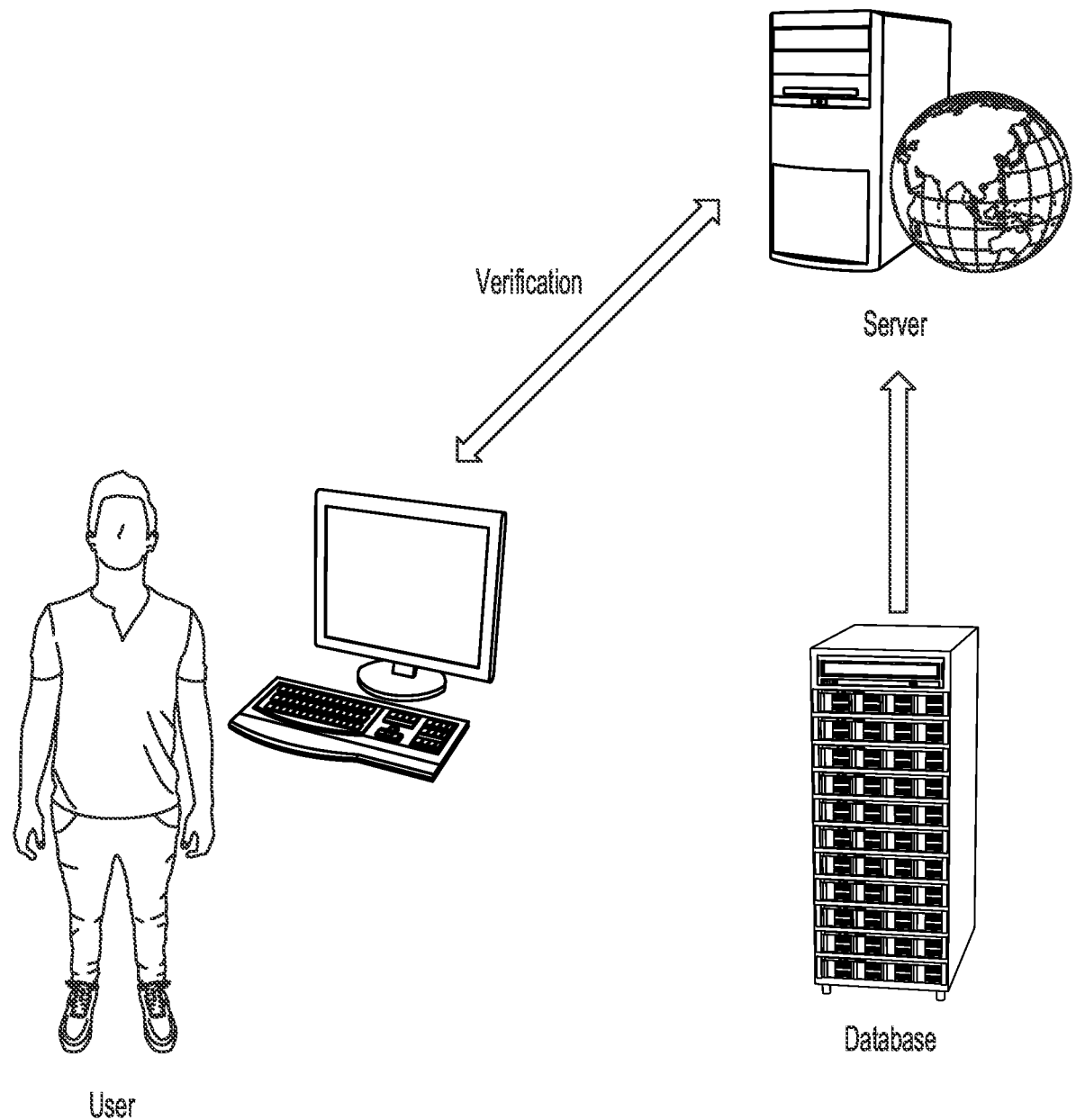
FIG. 3 is a schematic diagram illustrating an architecture on which a method for generating a verification code used for character replacement is based, according to an implementation of the present application.

It can be considered that the first character string described above is generated in advance based on a corresponding verification code generation rule and stored in a database on a server side, and FIG. 3 is a schematic diagram of an architecture of generating the first character string.

During character replacement, only some variable characters can be replaced. For example, a character string of a certain verification code is a character string of "输入两个汉字". Assume that the six Chinese characters in the character string are all variable characters. In actual operations, only two variable characters "两" and "汉" can be replaced. Assume that the two variable characters respectively correspond to backup characters "俩" and "焊". Therefore, the second character string obtained after the variable characters are replaced with the backup characters is "输入俩个焊字".

Certainly, all characters can be replaced. For example, assume that two characters in the first character string "红球" are both variable characters, and backup characters respectively corresponding to the two characters are pinyin "hong" and "qiu". The second character string obtained after character replacement is "hongqiu".

In actual applications, if variable characters correspond to different backup characters, a hybrid replacement method can be used. For example, the first character string "选择两个红球" is replaced with "xuan 择俩个 hong 求".

Apparently, based on the previous replacement method, the user can learn the meaning represented by the characters in the verification code, but the computer program is subject to relatively strong interference.

In actual operations, a corresponding verification code can be generated based on the second character string obtained after character replacement. The generating a verification code based on the second character string includes: generating a verification code in a specified format based on the second character string. The specified format includes at least one of a picture format and a text format.

In actual application scenarios, the user generally performs a certain operation based on the verification code. For example, the user enters a corresponding character string based on the verification code, or the user performs a certain operation based on behavior indicated by the verification code. However, regardless of whether the user enters a character string or performs a certain operation, the server needs to perform verification. To ensure verification accuracy, the server determines a verification standard. It can be understood that the marking verification information is a verification standard, and only when an operation of the user satisfies the verification standard, the verification can succeeds.

In a verification method in the actual application scenario, the user can enter a corresponding character string based on the verification code displayed in the verification interface. In this method, the marking verification information is the first character string. The verifying a user corresponding to the verification request includes: generating an input area in a user verification interface; obtaining a character string that is to be verified and is entered by the user in the input area based on the verification code; and verifying, based on the first character string, the character string to be verified.

Figure 4A:
FIG. 4a and FIG. 4b are schematic diagrams illustrating verification interfaces in different verification methods, according to an implementation of the present application.

That is, FIG. 4*a* shows a verification interface in this method. It can be seen that the verification interface includes a verification code and a corresponding input area. The user enters a corresponding character string in the input area based on the verification code for verification. Certainly, in FIG. 4a, the verification can succeed only when the user enters a Chinese phrase "红色" (assume that the first character string is "红色") in the input area based on the verification code "hong 色" (which is the second character string in the verification code).

In another verification method in the actual application scenario, the user can perform a corresponding verification operation based on the verification code displayed in the verification interface. In this method, the marking verification information includes pre-determined marking operation information. The verifying a user corresponding to the verification request includes: generating an operable verification code display area in a user verification interface; obtaining operation information that is to be verified and that is corresponding to an operation that is to be verified and that is performed by the user in the verification code display area based on the verification code; and verifying, based on the marking operation information, the operation information to be verified.

Figure 4B:
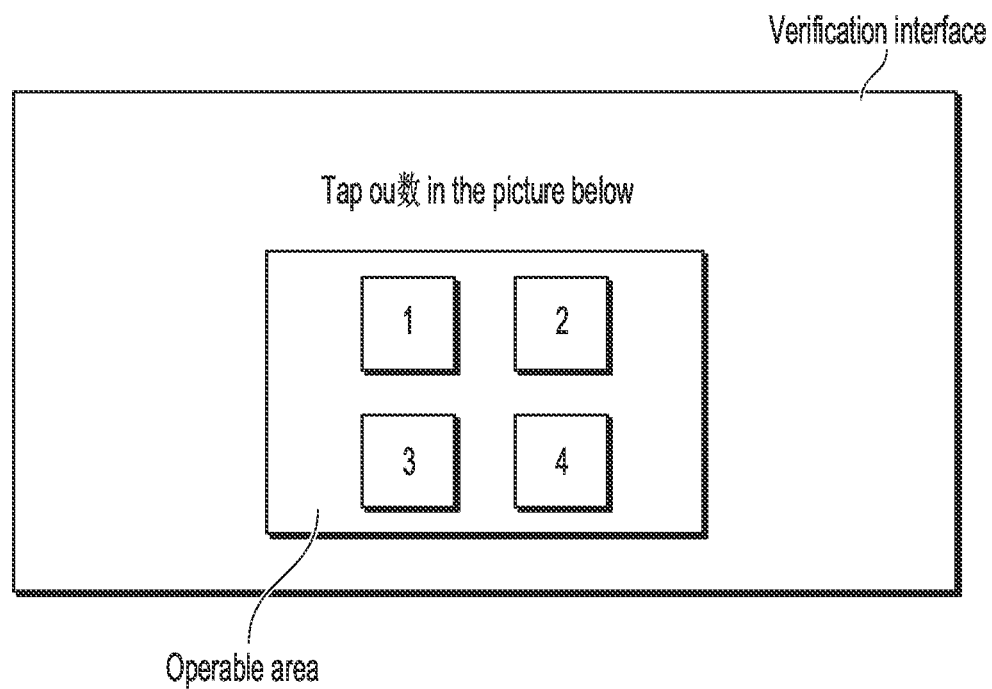

FIG. 4b shows a verification interface in this method. It can be seen that the verification interface includes an operable verification code display area that includes a verification code. The user can perform a corresponding operation to be verified in the verification code display area based on behavior indicated by the verification code. In FIG. 4b, assume that the marking operation information is that operation controls "2" and "4" are tapped. In this case, the verification can succeed after the user taps the operation controls "2" and "4" in the verification code display area based on the verification code "Tap ou 数 in the picture below". "ou" is the pinyin of "偶".

The previous two methods are merely intended to describe the verification method in this implementation of the present application, and impose no limitation on the present application.

The verification method provided in an implementation of the present application is described above. Based on the same idea, an implementation of the present application further provides an apparatus for verification based on a verification code.

Figure 5:
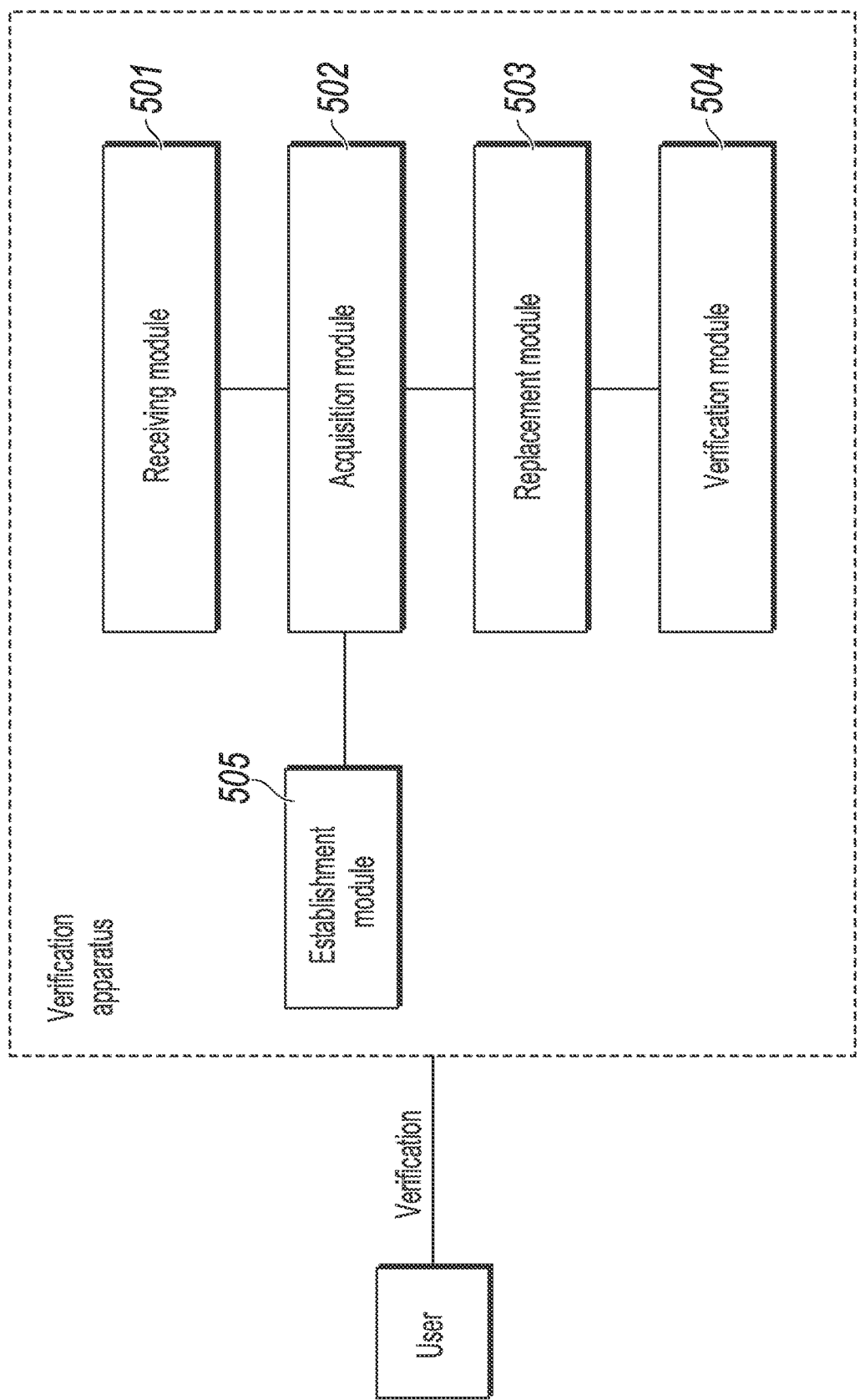
FIG. 5 is a schematic structural diagram illustrating an apparatus for verification based on a verification code, according to an implementation of the present application.

As shown in FIG. 5, the verification apparatus is disposed on a server side of a service provider, and the apparatus includes: a receiving module 501, configured to receive a verification request; an acquisition module 502, configured to obtain a pre-generated first character string after the verification request is received, where the first character string includes at least one variable character; a replacement module 503, configured to replace some or all characters with backup characters based on a pre-established correspondence between a variable character and a backup character, to obtain a second character string; and a verification module 504, configured to generate a verification code based on the second character string, and verify a user corresponding to the verification request.

The apparatus further includes an establishment module 505, configured to determine at least one homophonous character and/or synonymous character of any variable character; and use the determined homophonous character and/or synonymous character as a backup character of the variable character, and establish a correspondence between the backup character and the variable character.

The verification module 504 generates a verification code in a specified format based on the second character string, where the specified format includes at least one of a picture format and a text format.

The verification module 504 generates an input area in a user verification interface; obtains a character string that is to be verified and is entered by the user in the input area based on the verification code; and verifies, based on the first character string, the character string to be verified.

The verification module 504 generates an operable verification code display area in a user verification interface; obtains operation information that is to be verified and is corresponding to an operation that is to be verified and is performed by the user in the verification code display area based on the verification code; and verifies, based on pre-determined marking operation information, the operation information to be verified.

In the 1990s, whether a technical improvement is a hardware improvement (for example, an improvement to a circuit structure such as a diode, a transistor, or a switch) or a software improvement (an improvement to a method procedure) can be distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (such as a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor, a processor, or a computer-readable medium storing computer readable program code (such as software or firmware) that can be executed by the microprocessor or the processor, a logic gate, a switch, an application-specific integrated circuit (ASIC), a programmable logic controller, or an embedded microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to enable the controller to implement the same function in forms of the logic gate, the switch, the application-specific integrated circuit, the programmable logic controller, and the embedded microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the apparatus above is described by dividing functions into various units. Certainly, when the present application is implemented, functions of each unit can be implemented in one or more pieces of software and/or hardware.

A person skilled in the art should understand that an implementation of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, or an optical memory) that include computer-usable program code.

The present application is described with reference to the flowcharts and/or block diagrams of the method, the device (system), and the computer program product based on the implementations of the present application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be used to store information accessible by a computing device. Based on the definition in the present specification, the computer readable medium does not include transitory computer readable media (transitory media), for example, a modulated data signal and carrier.

It is worthwhile to further note that the term "include", "comprise", or their any other variants is intended to cover a non-exclusive inclusion, so a process, a method, a product, or a device that includes a list of elements not only includes those elements but also includes other elements which are not expressly listed, or further includes elements inherent to such a process, method, product, or device. Without more constraints, an element preceded by "includes a . . . " does not preclude the existence of additional identical elements in the process, method, product, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, or an optical memory) that include computer-usable program code.

The present application can be described in the general context of computer executable instructions executed by a computer, for example, a program module. Generally, the program module includes a routine, a program, an object, a component, a data structure, etc. that executes a specific task or implements a specific abstract data type. The present application can also be practiced in distributed computing environments. In the distributed computing environments, tasks are performed by remote processing devices connected through a communications network. In the distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore is described briefly. For related parts, references can be made to related descriptions in the method implementation.

The previous descriptions are only implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Figure 6:
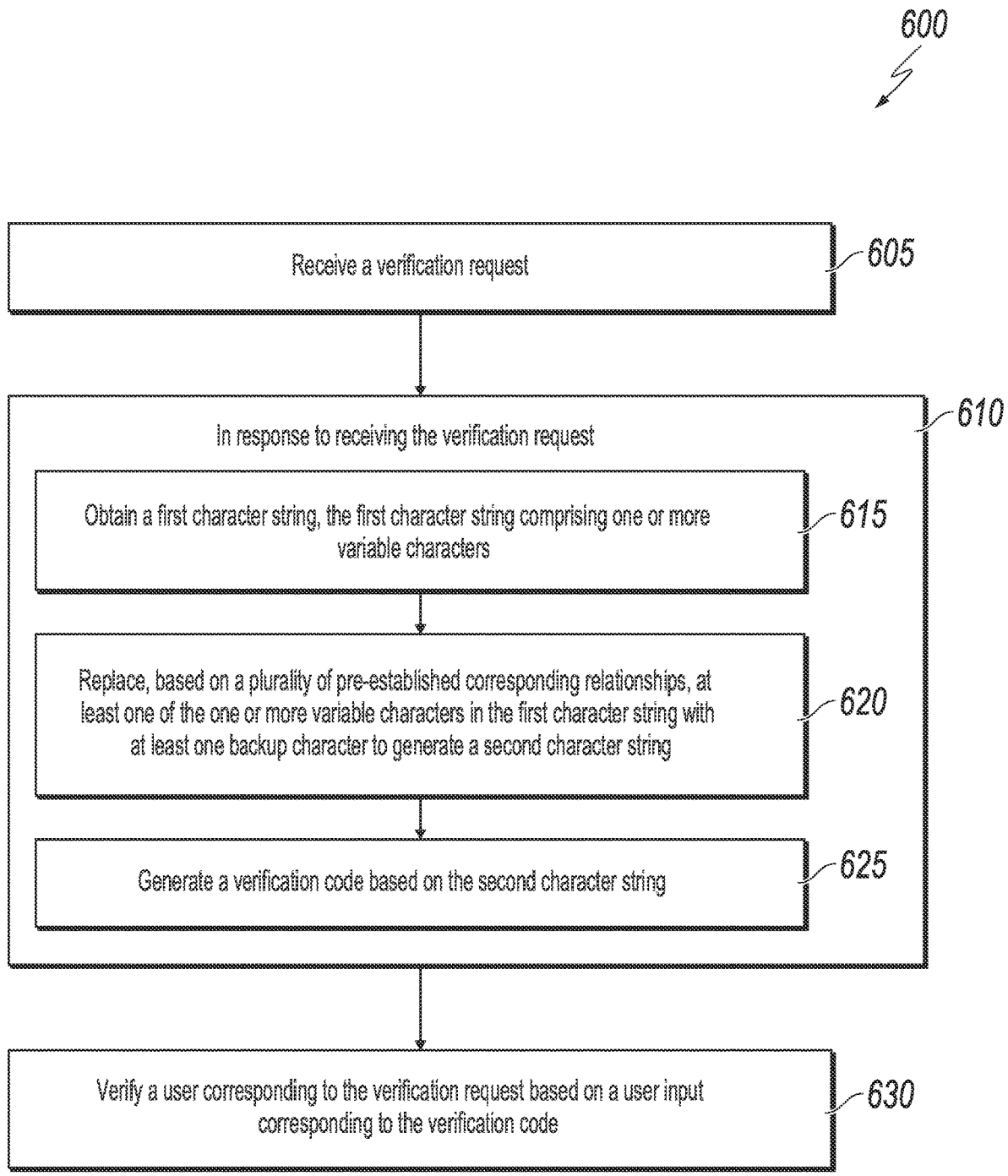
FIG. 6 is a flowchart illustrating an example of a computer-implemented method for generating a verification code, according to an implementation of the present disclosure.

FIG. 6 is a flowchart illustrating an example of a computer-implemented method 600 for generating a verification code, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 605, a verification request (or a validation request) is received. In some implementations, the verification request is received by a server to verify an identity of a user (such as, to verify whether the user is a person or a computer program). In some implementation, the server can be located on a back end of an online service provider. For example, the online service provider can be a website, a telecommunications carrier, or a data center, that provides an online service. In some implementations, the server can be a security server of the online service provider that prevents unauthorized user operations (such as, malicious attempts to login to a user account, cracking a user password by enumeration, and sales volume manipulation using scripts). In some implementations, the user can use a service provided by the online service provider. For example, an authorized user can be a real person that uses the service legally. In some implementations, an unauthorized user can be a computer script or a computer program that uses the service in an unauthorized manner.

In some implementations, the verification request can be triggered by a user. For example, when the user enters a login page, a verification request can be automatically generated and sent to a server to verify an identity of the user. In some implementations, the verification request can be triggered by the server based on a predetermined security rule. For example, the server can verify an identity of a user periodically or when detecting a risky user operation. From 605, method 600 proceeds to 610.

At 610, in response to receiving the verification request, steps 615, 620, and 625 are automatically performed, for example, by the server. From 610, method 600 proceeds to 615.

At 615, a first character string is obtained. The first character string comprises one or more variable characters. A variable character in the first character string can be changed or replaced. In some implementations, the first character string can include at least one of a number and text, and can be pre-generated by a server before receiving the verification request. From 615, method 600 proceeds to 620.

At 620, based on multiple pre-established corresponding relationships, at least one of the one or more variable characters in the first character string is replaced with at least one backup character to generate a second character string. For example, part or all of the variable characters in the first character string can be replaced with backup characters. In some implementations, a backup character can be the same type of character as a corresponding variable character. For example, both the backup character and its corresponding variable character can be one of Chinese characters, English characters, or numeric characters. In some cases, a backup character can be a different type of character as a corresponding variable character. The meaning of the second character string is not different from (or at least similar to) the meaning of the first character string. In other words, a real person can understand that the meaning of the second character string is the same as or similar to the meaning of the first character string.

In some implementations, the multiple pre-established corresponding relationships are corresponding relationships between multiple variable characters and multiple backup characters. A corresponding relationship can be a one-to-one relationship. For example, a single variable character corresponds to a single backup character. In some cases, a corresponding relationship can be a one-to-many relationship. For example, a single variable character corresponds to different backup characters, or different variable characters correspond to the same backup character.

In some implementations, to pre-establish the multiple corresponding relationships, the following procedure can be performed. For example, for each particular variable character of the multiple variable characters, at least one of one or more homophonous characters of the particular variable character and one or more synonymous characters of the particular variable character is determined. The determined at least one character can be used as at least one particular backup character of the particular variable character. At least one particular corresponding relationship between the particular variable character and the at least one particular backup character can be established. From 620, method 600 proceeds to 625.

At 625, a verification code (or a validation code) is generated based on the second character string. In some implementations, the generated verification code is in at least one of a picture format and a text format, and can be used to instruct a user to perform one or more operations. In some implementations, one or more additional methods (such as, character distortion, color change, or background addition) can be applied to the generated verification code. From 625, method 600 proceeds to 630.

At 630, a user corresponding to the verification request is verified based on a user input corresponding to the verification code. In some implementations, to verify the user, the verification code and an input area corresponding to the verification code are displayed, for example, in a verification interface on a user device. The user can make one or more operations in the input area according to the verification code (such as, inputting one or more characters, or selecting one or more selectable items displayed in the input area). The user input in the input area can be received by, for example, a server. The user corresponding to the verification request can be verified based on the user input.

In some implementations, the user input is associated with a third character string or one or more selection operations. For example, if the user input correctly matches the requirement of the verification code, it can be determined that the user is a real person. In other words, the user is verified (or validated). Otherwise, if the user input does not match the requirement of the verification code, it can be determined that the user is not a real person. For example, the user can be a computer program, and cannot be verified. In some implementations, if it is determined that the user is a real person, user access to a service is allowed. If it is determined that the user is not a real person, user access to a service is blocked. After 630, method 600 can stop.

A verification code (for example, a Completely Automated Public Turing test to tell Computers and Humans Apart (CAPTCHA)) can be used to determine whether a user is a real person or an unauthorized computer program. Normally, when displaying a verification code to verify a user, character distortion, color change, or background addition is first applied to the verification code to increase recognition difficulty by a computer program. However, the modification to the verification code also increases recognition interference to the user and decreases recognition accuracy by the user. The subject matter described in this specification provides a simple and user friendly verification code generation method. For example, one or more variable characters in a first character string are replaced with one or more backup characters to generate a second character string. The meaning of the second character string is not different from (or at least similar to) the meaning of the first character string. The second character string, instead of the first character string, is used to generate a verification code. In doing so, recognition difficulty by a computer program is increased, thereby reducing the possibility of unauthorized operations. A real person can intuitively understand the meaning of the verification code. As a result, recognition accuracy by a real person is increased and time spent on a verification process is reduced, thereby improving user experience during the verification process and increasing overall data and computer system operational security.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving a verification request;
in response to receiving the verification request:
obtaining a first character string, wherein the first character string comprises one or more variable characters, wherein the first character string is a first instruction to perform one or more operations;
replacing, based on a plurality of pre-established corresponding relationships, at least one of the one or more variable characters in the first character string with at least one backup character to generate a second character string, wherein a replaced variable character of the at least one of the one or more variable characters in the first character string and a corresponding backup character of the at least one backup character are homophonous characters or synonymous characters, and the second character string is a second instruction to perform the one or more operations;
generating a verification code based on the second character string; and
displaying the verification code and an input area corresponding to the verification code, wherein the input area includes a plurality of selectable items, and the verification code instructs a user to select one or more selectable items from the plurality of selectable items;
receiving a user input corresponding to the verification code in the input area; and
verifying the user corresponding to the verification request based on the user input.

2. The computer-implemented method of claim 1, wherein the first character string is pre-generated before receiving the verification request.

3. The computer-implemented method of claim 1, wherein the replaced variable character is a Chinese character, and the corresponding backup character is a homophonous character or a synonymous character of the Chinese character.

4. The computer-implemented method of claim 1, wherein the user input is associated with a third character string or a plurality of selection operations.

5. The computer-implemented method of claim 1, wherein the plurality of pre-established corresponding relationships are between a plurality of variable characters and a plurality of backup characters, and pre-establishing the plurality of corresponding relationships includes:
for each particular variable character of the plurality of variable characters:
determining at least one of one or more homophonous characters of the particular variable character and one or more synonymous characters of the particular variable character;
using the determined at least one character as at least one particular backup character of the particular variable character; and
establishing at least one particular corresponding relationship between the particular variable character and the at least one particular backup character.

6. The computer-implemented method of claim 1, wherein the generated verification code is in at least one of a picture format and a text format.

7. A non-transitory, computer-readable medium storing one or more instructions executable by a computer system to perform operations comprising:

receiving a verification request;

in response to receiving the verification request:

obtaining a first character string, wherein the first character string comprises one or more variable characters, wherein the first character string is a first instruction to perform one or more operations;

replacing, based on a plurality of pre-established corresponding relationships, at least one of the one or more variable characters in the first character string with at least one backup character to generate a second character string, wherein a replaced variable character of the at least one of the one or more variable characters in the first character string and a corresponding backup character of the at least one backup character are homophonous characters or synonymous characters, and the second character string is a second instruction to perform the one or more operations;

generating a verification code based on the second character string; and displaying the verification code and an input area corresponding to the verification code, wherein the input area includes a plurality of selectable items, and the verification code instructs a user to select one or more selectable items from the plurality of selectable items;

receiving a user input corresponding to the verification code in the input area; and verifying the user corresponding to the verification request based on the user input.

8. The non-transitory, computer-readable medium of claim 7, wherein the first character string is pre-generated before receiving the verification request.

9. The non-transitory, computer-readable medium of claim 7, wherein the replaced variable character is a Chinese character, and the corresponding backup character is a homophonous character or a synonymous character of the Chinese character.

10. The non-transitory, computer-readable medium of claim 7, wherein the user input is associated with a third character string or a plurality of selection operations.

11. The non-transitory, computer-readable medium of claim 7, wherein the plurality of pre-established corresponding relationships are between a plurality of variable characters and a plurality of backup characters, and pre-establishing the plurality of corresponding relationships includes:

for each particular variable character of the plurality of variable characters:

determining at least one of one or more homophonous characters of the particular variable character and one or more synonymous characters of the particular variable character;

using the determined at least one character as at least one particular backup character of the particular variable character; and establishing at least one particular corresponding relationship between the particular variable character and the at least one particular backup character.

12. The non-transitory, computer-readable medium of claim 7, wherein the generated verification code is in at least one of a picture format and a text format.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving a verification request;

in response to receiving the verification request:

obtaining a first character string, wherein the first character string comprises one or more variable characters, wherein the first character string is a first instruction to perform one or more operations;

replacing, based on a plurality of pre-established corresponding relationships, at least one of the one or more variable characters in the first character string with at least one backup character to generate a second character string, wherein a replaced variable character of the at least one of the one or more variable characters in the first character string and a corresponding backup character of the at least one backup character are homophonous characters or synonymous characters, and the second character string is a second instruction to perform the one or more operations;

generating a verification code based on the second character string; and displaying the verification code and an input area corresponding to the verification code, wherein the input area includes a plurality of selectable items, and the verification code instructs a user to select one or more selectable items from the plurality of selectable items;

receiving a user input corresponding to the verification code in the input area; and verifying the user corresponding to the verification request based on the user input.

14. The computer-implemented system of claim 13, wherein the first character string is pre-generated before receiving the verification request.

15. The computer-implemented system of claim 13, wherein the replaced variable character is a Chinese character, and the corresponding backup character is a homophonous character or a synonymous character of the Chinese character.

16. The computer-implemented system of claim 13, wherein the user input is associated with a third character string or a plurality of selection operations.

17. The computer-implemented system of claim 13, wherein the generated verification code is in at least one of a picture format and a text format.

* * * * *